3,793,354
DEHYDROGENATION OF ALCOHOLS TO KETONES
Irving Schwager, Hopewell Junction, Robert J. Leak, Wappingers Falls, and Edward L. Cole, Fishkill, N.Y., assignors to Texaco Inc., New York, N.Y.
No Drawing. Original application July 3, 1969, Ser. No. 839,082, now Patent No. 3,671,591. Divided and this application Feb. 23, 1972, Ser. No. 228,750
Int. Cl. C07f 15/00, 15/04
U.S. Cl. 260—429 R
6 Claims

ABSTRACT OF THE DISCLOSURE

A Group VIII metal containing pyrolyzed polyacrylonitrile polymer catalyst and hydrocarbon conversion process for the dehydrogenation of alcohols to ketones particularly isopropyl alcohol to acetone and the dehydrogenation of nitro compounds to amines, particularly 2-nitropropane to isopropylamine by the use of said catalyst.

---

This is a division of application Ser. No. 839,082, filed July 3, 1969, now Pat. No. 3,671,591.

This invention relates to a new Group VIII metal containing pyrolyzed polyacrylonitrile polymer catalyst and to a hydrocarbon conversion process utilizing said catalyst for the dehydrogenation of alcohols to ketones and the hydrogenation of nitro compounds to amines.

In the dehydrogenation of alcohols to ketones many catalysts have been used such as copper chromite to effect dehydrogenation. In addiiton, a dehydrogenation catalyst of the prior art such as copper chromite has in addition been used for the hydrogenation of nitro compounds to amines. A particular problem associated with the use of a catalyst for both a dehydrogenation and hydrogenation process is the necessity for selective conversion to the desired product without the formation to any substantial degree of undesired side reaction products, while maintaining a high percent conversion to the desired product. Thus, the dehydrogenation of an alcohol such as isopropyl alcohol to acetone can result in the formation of propylene and other light gases as side reaction products whereas the hydrogenation of a nitro compound such as 2-nitropropane to isopropylamine can result in the formation of diisopropyl amine and isopropyl alcohol. As is apparent from the foregoing, there exists the problem of selective conversion of the starting reactant to the desired product at high conversions. The formation of undesired side reaction products decreases the yield of product and in addition contaminates the desired product necessitating additional treating steps for the removal of contaminants. As is apparent from the foregoing, there is incentive to discover processes whereby a catalyst can be utilized for both the dehydrogenation of alcohols to ketones and the hydrogenation of nitro compounds to amines in good yields while minimizing any side reactions and the formations of undesired products.

It is therefore an object of this invenion to dehydrogenate alcohols to ketones and hydrogenate nitro compounds to amines, at high yields while maintaining the formation of undesired products.

It has now been found that organic secondary alcohols can be dehydrogenated to organic ketones and organic nitro compounds hydrogenated to organic primary amines utilizing a novel catalyst by a process which comprises contacting an organic secondary alcohol or an organic nitro compound under dehydrogenation and hydrogenation conditions respectively with a catalytic amount of a Group VIII metal containing pyrolyzed polyacrylonitrile polymer and recovering an organic ketone and organic primary amine respectively. Thus it has been found that when an organic secondary alcohol is contacted with a catalytic amount of a Group VIII containing pyrolyzed polyacrylonitrile polymer, hereinafter referred to as catalyst, a high yield or an organic ketone is produced while minimizing the formation to any substantial extent of secondary reactions and secondary products such as light gases. More particularly, it has been found that when isopropyl alcohol is contacted with a catalytic amount of catalyst, conversions often above 90% mole percent to acetone with minimum formations of propylene and other light gases, generally below 10 mole percent and more often below 5 mole percent are achieved. These results are in sharp contrast to a platinum on an activated carbon catalyst wherein only 4 mole percent acetone is formed with the formation of 96 mole percent propylene. In addition, the above catalyst under hydrogenation condition catalytically converts organic nitro compounds to organic amines at high yields while minimizing side reactions and formation of undesired products. More particularly, the hydrogenation of 2-nitropropane to isopropyl amine utilizing the above catalyst can produce yields above 90 mole percent often above 95 mole percent with minimum formation of undesired products such as diisopropyl amine and isopropyl alcohol generally below 10 mole percent. These results are in sharp contrast to complete inactivity of platinum on silica gel.

In general the dehydrogenation process of this invention is carried out by contacting the organic secondary alcohol with a catalytic amount of catalyst under dehydrogenation conditions of temperature and pressure sufficient to produce an organic ketone, whereas the hydrogenation process is carried out by contacting an organic nitro compound with a catalytic amount of catalyst under hydrogenation conditions of temperature, pressure, and hydrogenation concentrations sufficient to produce an organic primary amine. The term "catalytic amount" for the dehydrogenation process is used herein to mean that concentration by weight of catalyst which during dehydrogenation produces a yield of organic ketone in excess of other side reaction products, preferably at a conversion of at least 90 mole percent. In general, a concentration of catalyst of from about 1 to about 20 weight percent, more preferably from about 5 to about 10 weight percent based upon the weight of the starting organic secondary alcohol is utilized during the hydrogenation process. The product, that is organic ketone, is then recovered by conventional means. In carrying out the hydrogenation process, a catalyst concentration is utilized which produces a yield of organic mono amine greater than production of side reaction products, preferably at a conversion of at least 90 mole percent. In general, a concentration of catalyst of from about 1 to about 20 weight percent, more preferably from about 5 to about 10 weight percent based upon the weight of the organic nitro component is utilized during the hydrogenation process. The organic primary amine is then recovered by conventional means.

The conditions for dehydrogenation can be varied over a wide range as to liquid hourly space velocity (LHSV, volume of organic secondary alcohol to volume of catalyst per hour), temperature, pressure, and the concentration of catalyst. These conditions are adjusted in order to produce a dehydrogenation step wherein the catalyst is present in a concentration sufficient to effect conversion of the organic secondary alcohol to the organic ketone, and are adjusted in order to maximize such yield while minimizing the formation of side reaction products.

The organic secondary alcohol is dehydrogenated in general at a temperature of from about 250° C. to about 700° F., preferably from about 350° F. to about 500° F. pressures of from about 0.1 to about 100 p.s.i.g., preferably from about 0.5 to about 15 p.s.i.g. and liquid hourly space velocities of from about 0.1 to about 5, preferably from about 0.2 to about 1 (volumes of organic secondary alcohol per volume of catalyst per hour).

The conditions for hydrogenation can be varied over a wide range as to liquid hourly space velocity (LHSV, volume of feed to volume of catalyst per hour), hydrogen gas rate (volume of hydrogen to volume of organic nitro compound, s.c.f./bbl.), temperature, pressure, and the concentration of catalyst. These conditions are adjusted in order to produce a hydrogenation step wherein the hydrogen and catalyst are present in a concentration sufficient to effect production of organic amine and are adjusted in order to maximize the yield of organic amine while minimizing the side reaction products.

The organic nitro compound is contacted with hydrogen in general at a temperature of from about 200° F. to about 500° F., preferably from about 250° F. to about 350° F.; pressures of from about 5 to about 1000 p.s.i.g., preferably from about 15 to about 500 p.s.i.g.; liquid hourly space velocities of from about 0.1 to about 5, preferably from about 0.2 to about 1 volume of feed per volume of catalyst per hour; and hydrogen rates of from about 500 to about 2500, preferably from about 1000 to about 2000 standard cubic feet (s.c.f./bbl.) of feed.

As stated above the process of this invention utilizes one or more novel Group VIII metal containing pyrolyzed polyacrylonitrile polymers. In general the catalyst is prepared by the process which comprises pyrolyzing a polyacrylonitrile polymer under pyrolysis conditions of temperature and pressure, contacting the pyrolyzer polymer from the preceding step with a Group VIII metal and recovering a Group VIII metal containing pyrolyzed polyacrylonitrile polymer, containing from 0.2 to about 50 wt. percent Group VIII metal. By the use of the term polyacrylonitrile polymers is meant, a polyacrylonitrile polymer which comprises at least about 80 wt. percent of the polymerized monomer units being derived from acrylonitrile more preferably 90 wt. percent. The polyacrylonitrile polymer is then subjected to conditions of pyrolysis. As stated above, it is preferred that the stating polyacrylonitrile polymer have at least 80 wt. percent of the polymerized monomer units being derived from acrylonitrile. Thus the remaining 20% by weight can be other monomers which polymerize with acrylonitrile. In a still more preferred sense it is preferred that the polyacrylonitrile polymer be derived substantially from acrylonitrile, that is at least 95 wt. percent being derived from acrylonitrile. The polyacrylonitrile polymers are for the most part amorphous solids or crystalline solids. It will be understood that for the purposes of this specification that the term polymer is used in a generic sense to include homopolymers, copolymers, terpolymers or ither inter polymers which have molecular weights of at least about 25,000 more preferably from about 25,000 to about 1,300,000.

Acrylonitrile is usually polymerized by the free radical polymerization technique (also known as the addition polymerization technique). Such technique consists of contacting the monomers with polymerization initiator either in the absence or presence of a diluent at a temperature usually between 0° and 200° C. The polymerization initiator is a substance capable of liberating a free radical under the conditions of polymerization, e.g., benzoyl peroxide, tert-butyl hydroperoxide, cumyl peroxide, potassium persulfate, acetyl peroxide, hydrogen peroxide, azobisisobutyronitrile, or perbenzoic acid. For reasons of economy, benzoyl peroxide or azobisisobutyronitrile are most commonly used.

Acrylonitrile may also be polymerized or copolymerized using an anionic initiator such as naphthylsodium or butyllithium in tetrahydrofuran solution or sodium metal in liquid ammonia solution.

The polymerization of acrylonitrile may also be effected by other polymerization techniques such as by the use of Ziegler type catalysts, gamma ray irradiation, or thermal techniques.

The diluent for the polymerization mixture may be either an inert solvent such as benzene, toluene, xylene, cyclohexane, n-hexane, naphtha, tetrahydrofuran, white oil, or dodecane; or a non-solvent such as water or liquid ammonia. Thus, the polymerization can be carried out in bulk, solution, emulsion, or suspension.

The temperature for the polymerization depends on the catalyst system employed and to some extent upon the nature of the monomers to be polymerized. Thus, the copolymerization of acrylonitrile with an acrylamide may be catalyzed by an anionic initiator at temperatures from about −100° C. to 50° C., preferably at −70° C. to 0° C. On the other hand, the optimum temperature for effecting the free radical catalyzed homopolymerization of acrylonitrile is usually from 0° C. to 100° C., preferably 30° C. to 80° C. Similarly, the optimum temperature for effecting the free radical catalyzed interpolymerization of acrylonitrile with one or more polymerizable comonomers will vary according to the reactivity of these monomers. In most instances such temperatures likewise are within the range from about 0° C. to 100° C.

A large variety of comonomers can be used to form interpolymers with the acrylamides of this invention. For the most part, the comonomers are polymerizable vinyl monomers. They include, for example: (1) esters of unsaturated alcohols, (2) esters of unsaturated acids, (3) vinyl cyclic compounds, (4) unsaturated ethers, (5) unsaturated ketones, (6) unsaturated amides, (7) unsaturated saturated polyhydric alcohols (e.g., butenediol), (10) unsaturated acids, (11) unsaturated acid anhydrides, (12) unsaturated acid chloride, and (13) unsaturated nitriles other than acrylonitrile.

(1) Esters of unsaturated alcohols: Allyl, methallyl, crotyl, 1-chloroallyl, 2-chloroallyl, cinnamyl, vinyl, methylvinyl, 1-phenally, butenyl, etc., esters of (a) saturated acids such as for instance, acetic, propionic, butyric, valeric, caproic, steric, etc.; (b) unsaturated acids such as acrylic, alpha-substituted acrylic (including alkacrylic, e.g. methacrylic, ethylacrylic, propylacrylic, etc.), crotonic, oleic, linoleic, linolenic, etc., (c) polybasic acids such as oxalic, malonic, succinic, glutaric, adipic, pimelic, suberic, azelaic, sebacic, etc., (d) unsaturated polybasic acids such as maleic, fumaric, citraconic, mesaconic, itaconic, methylenemalonic, acetylenedicarboxylic aconitic, etc., (e) aromatic acids, e.g., benzoic, phenylacetic, phthalic, terephthalic, benzolyphthalic, etc.

(2) The esters of saturated alcohols such as methyl, ethyl, propyl, isopropyl, butyl, isobutyl, sec-butyl, tert-butyl, 2-ethylhexyl, cyclohexyl, benenyl, etc., with unsaturated aliphatic monobasic and polybasic acids, examples of which are illustrated above.

(3) Esters of unsaturated polyhydric alcohols, e.g., butenediol, etc., with saturated and unsaturated aliphatic and aromatic, monobasic and polybasic acids, illustrative examples of which appear above.

(4) Vinyl cyclic compounds including (a) monovinyl aromatic hydrocarbons, e.g., styrene, o-, m-, p-chlorostyrenes, -bromostyrenes, -fluorostyrenes, -methylstyrenes, -ethylstyrenes, -cyanostyrenes, do-, tri-, and tetra-, etc., -chlorostyrenes, -bromostyrenes, -fluorostyrenes, -methylstyrenes, -ethylstyrenes, -cyanostyrenes, vinylcyclohexane, vinylfuran, vinylpyridine, vinylbenzofuran, divinylbenzene, trivinylbenzene, allylbenzene, N-vinylcarbazole, N-vinylpyrrolidone, N-vinyloxazolidone, etc.

(5) Unsaturated ethers such as, e.g. methyl vinyl ether, ethyl vinyl ether, cyclohexyl vinyl ether; octyl vinyl ether, diallylether, allyl ethyl ether, etc.

(6) Unsaturated ketones, e.g., methyl vinyl ketone, ethyl vinyl ketone, etc.

(7) Unsaturated amides, such as acrylamide, N-methylacrylamide, N-phenylacrylamide, N-allylacrylamide, N-methylolacrylamide, N-allylcaprolactam, etc.

(8) Unsaturated aliphatic hydrocarbons, for instance, ethylene, propylene, butenes, butadiene, isoprene, 2-chlorobutadiene, alpha-olefins, etc.

(9) Vinyl halides, e.g., vinyl fluoride, vinyl chloride, vinyl bromide, vinyl iodide, vinylidene chloride, vinylidene bromide, allyl chloride, allyl bromide, etc.

(10) Unsaturated acid anhydrides, e.g., maleic, citraconic, propylacrylic, etc., examples of which appear above.

(11) Unsaturated acid anhydrides, e.g., maleic, citraconic, itaconic, cis-4-cyclohexene-1, 2-dicarboxylic, bicyclo (2.2.1) 5-heptene-2, 3-dicarboxylic, etc.

(12) Unsaturated acid halides such as cinnamoyl, acrylyl, methacrylyl, crotonyl, oleyl, fumaryl, etc.

(13) Unsaturated nitriles other than acrylonitrile, e.g., methacrylonitrile and other substituted acrylonitriles.

The solid polyacrylonitrile polymer is then subjected to a pyrolysis step. As stated above the pyrolysis of the polyacrylonitrile polymer is carried out in the presence of oxygen, preferably in the presence of air. In general the conditions as to time, temperature, pressure and oxygen concentration which are utilized are temperatures of from about 300° to about 500° F., more preferably from about 350° to about 450° F. pressures of from about 0.1 to about 2 atm., preferably of from about 0.5 to about 1 atm. and a contact time in hours of from about 6 to about 96, more preferably from about 12 to about 48. It is preferred in preparing the pyrolyzed polymers to pelletize the solid polymer prior to pyrolysis. After the pyrolysis step either a tan to brown solid material, or a black solid carbonaceous material is generally recovered.

The polyacrylonitrile polymer in general is converted to the Group VIII metal containing pyrolyzed polyacrylonitrile polymer by contacting the pyrolyzed polyacrylonitrile polymer with an aqueous solution of a Group VIII metal salt or acid, preferably the Group VIII metal chloride or chloro acid such as chloroplatinic acid. The catalyst is then recovered by evaporating the aqueous solution of polymer and Group VIII metal salt or acid to remove water, thermally treating the polymer, preferably in an inert atmosphere, followed by hydrogen reduction at elevated temperatures. In general concentrations of Group VIII metal salt or acid based upon the weight of the polymer of from about 0.2 wt. percent to about 50 wt. percent are utilized in preparing the catalyst. In general temperatures of from about 400° F. to about 700° F., more preferably from about 550° F. to about 650° F. in an inert atmosphere are utilized for the thermal treatment step. In the hydrogen reduction step, temperatures of from about 500° F. to about 700° F. in a hydrogen atmosphere, preferably at pressures from about 15 p.s.i.g. to about 50 p.s.i.g. and at hydrogen gas rates of from about 0.5 cu. ft./hr. to about 2.0 cu. ft./hr. are utilized. The preferred metal content of the catalyst is from about 0.2 wt. percent to about 50 wt. percent still more preferably from about 0.5 wt. percent to about 5.0 wt. percent based upon the weight of the catalyst. It is preferred that the catalyst contain platinum, palladium, or nickel as the Group VIII metal.

It is contemplated within the scope of this invention that both the dehydrogenation and hydrogenation process when practiced on a continuous basis can provide for recycle of nonconverted organic secondary alcohols and organic nitro compounds respectively to the feed stock for reprocessing. In addition, it is contemplated within the scope of this invention that the hydrogenation and dehydrogenation process can be carried out in batch, continuous and semi-continuous cycles employing hydrogenation and dehydrogenation equipment such as heretofore have been employed for the preparation of organic ketones from organic secondary alcohols and organic primary amines from organic nitro compounds. In addition, a multi-stage mode of operation that is a repeating of the process several times can be utilized in practicing the process of this invention.

A wide variety of organic secondary alcohols can be utilized in the process of this invention as well as a wide variety of organic nitro compounds for conversion to primary amines.

Typical examples of starting reactants are organic secondary alcohols represented by the structure:

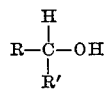

and organic nitro compounds represented by the structure:

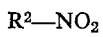

wherein R, R', and $R^2$ are each a hydrocarbon radical and can be the same or different.

It is particularly preferred that such hydrocarbon radicals contain from 1 to about 30 carbon atoms, more preferably from 1 to about 8 carbon atoms.

Typical examples of hydrocarbon radicals are alkyl radicals such as methyl, ethyl, isopropyl, butyl, t-butyl, 3-methyl-1-pentyl, and n-octyl, cycloalkyl radicals such as cyclopentyl, alkylated cycloalkyl radicals such as mono and polymethylcyclopentyl radicals, aryl and cycloalkyl substituted alkyl radicals such as phenyl and alkylphenyl substituted alkyl radicals examples of which are benzyl, methylbenzyl, caprylbenzyl, phenylethyl, phenylpropyl, naphthylmethyl, naphthylethyl, aryl radicals such as phenyl, and naphthyl, alkaryl radicals such as xylyl, alkylphenyl, and ethylphenyl.

Typical examples of organic secondary alcohols are isopropyl alcohol, secondary butyl alcohol, 2-octanol, 3-ethyl-2-pentanol, 3-methoxy-2-propanol, 3-phenyl-2-propanol, 4-phenyl-2-pentanol.

Typical examples of organic nitro compounds which can be converted to organic amines are 1-nitropropane, 2-nitropropane, nitrobenzene, 1,1-dinitrodiphenyl, 1-nitrooctane, 1-nitrooctadecane, 1,6-dinitrohexamethylene, 2-nitrooctane, and 2-nitrooctadecane.

The invention can be better appreciated by the following non-limiting examples:

EXAMPLE 1

To a 3 neck one liter flask equipped with stirrer, thermometer, and reflux condenser is added under a nitrogen atmosphere 55 grams (1.0 mole) of acrylonitrile, 750 milliliters of water and 1.0 gram of azo-bis-isobutyronitrile. The mixture is heated with stirring to a temperature of 140° F. which is maintained for a period of 2 hours. After this period, 1 additional gram of azo-bis-isobutyronitrile is added and the mixture stirred at 140° F. for an additional two hours. The mixture is reduced to ambient temperature and a solid polymer is recovered by filtration. The polymer is washed with water, partially air dried and dried for 12 hours at 250° F. A white polymer 36 grams is recovered. The polymer (36 grams) is then pyrolyzed at 300° F. to 450° F. in an air stream over a period of 12 hours. A brown material (32 grams) is obtained which is then pelleted and calcined at 800° F. for a period of 30 minutes under a nitrogen atmosphere. A yield of 21 grams of black material is then recovered which has 67.2 wt. percent carbon, 2.9 wt. percent hydrogen, 18.1% nitrogen and a surface area of two meters$^2$ per gram. The pyrolyzed polyacrylonitrile polymer (10 grams) together with an aqueous solution (5.0 ml) containing 2.5 wt. percent of chloroplatinic acid are added to a glass flask equipped with stirrer. The temperature is increased to 200° F. with stirring, and the temperature maintained for a period of 2 hours during which time the water evaporates from the mixture. After the water has evaporated from the mixture, the temperature is increased to 600° F. under a nitrogen atmosphere for a period of 3 hours. The temperature is reduced to ambient temperature and hydrogen at atmospheric pressure is passed through the catalyst mixture as the temperature is increased to 600° F. The temperature is maintained for a period of 2 hours after which the temperature is reduced to ambient temperature. A platinum containing pyrolyzed polyacrylonitrile polymer is recovered which has a platinum content of 0.5 wt. percent.

EXAMPLE 2

Example 1 is repeated except 12 ml. of an aqueous nickel acetate solution containing 17.5 wt. percent nickel acetate is utilized in place of the chloroplatinic acid solution. A nickel containing pyrolyzed polyacrylonitrile polymer is recovered which has a nickel content of 5.0 wt. percent.

EXAMPLE 3

To a 3 neck 1 liter flask equipped with stirrer, thermometer, and reflux condenser is added in a nitrogen atmospheric pressure is passed through the catalyst mixture as phere 55 grams of acrylonitrile, 3.0 grams of methylmethacrylate, 750 milliliters of water and 1.0 gram of azobisisobutyronitrile. The mixture is heated with stirring to a temperature of 140° F. which is maintained for a period of 2 hours. After this period 1 gram of azobisisobutyronitrile is added and the mixture stirred at 140° F. for an additional two hours. The mixture is reduced to ambient temperature and a solid polymer is recovered by filtration. The polymer is washed with water, partially air dried and dried for 12 hours at 250° F. The polymer, 25 grams, is then pyrolyzed at 300° to 450° F. in an air stream over a period of 12 hours. The material obtained is then pelleted and calcined at 800° F. for a period of 30 minutes under a nitrogen atmosphere. The polymer is then recovered. The polymer is then contacted with an aqueous solution of chloroplatinic acid under the conditions set forth above in Example 1. A platinum containing pyrolyzed polyacrylonitrile polymer is then recovered.

EXAMPLE 4

To a 3 neck 1 liter flask equipped with a stirrer, thermometer, and reflux condenser is added under a nitrogen atmosphere 55 grams (1.0 mole) of acrylonitrile, 7 grams of N,N'-dimethylacrylamide, 750 milliliters of water and 1.0 gram of azo-bis-isobutyronitrile. The mixture is heated with stirring to a temperature of 140° F. which is maintained for a period of 2 hours. After this period 1 gram of azobisisobutyronitrile is added and the mixture is reduced to ambient temperature and a solid polymer is recovered by filtration. The polymer is washed with water, partially air dried and dried for 12 hours at 250° F. The polymer 28 grams is then pyrolyzed at 300° to 450° F. in an air stream over a period of 12 hours. The material obtained is then pelleted and calcined at 800° F. for a period of 30 minutes under a nitrogen atmosphere. The polymer is then recovered. The polymer is then contacted with an aqueous solution of chloroplatinic acid under the conditions set forth above in Example 1. A platinum containing pyrolyzed polyacrylonitrile polymer is then recovered.

EXAMPLE 5

To a 3 neck 1 liter flask equipped with a stirrer, thermometer, and reflux condenser is added under a nitrogen atmosphere 60 grams of acrylonitrile, 3 grams of dimethylmaleate, 750 milliliters of water and 1.0 gram of azobis-isobutyronitrile. The mixture is heated with stirring to a temperature of 140° F. which is maintained for a period of 2 hours. After this period 1 gram of azobisisobutyronitrile is added and the mixture stirred at 140° F. for an additional two hours. The mixture is then reduced to ambient temperature and a solid polymer is recovered by filtration. The polymer is washed with water, partially air dried and dried for 12 hours at 250° F. The polymer 30 grams is then pyrolyzed at 300° to 450° F. in an air stream over a period of 12 hours. The material obtained is then pelleted and calcined at 800° F. for a period of 30 minutes under a nitrogen atmosphere. The polymer is then recovered. The polymer is then contacted with an aqueous solution of chloroplatinic acid under the conditions set forth above in Example 1. A platinum containing pyrolyzed polyacrylonitrile polymer is then recovered.

EXAMPLE 6

To a 3 neck 1 liter flask equipped with a stirrer, thermometer, and reflux condenser is added a nitrogen atmosphere, 55 grams (1.0 mole) of acrylonitrile, 4 grams of vinylacetate, 750 milliliters of water and 1.0 gram of azobisisobutyronitrile. The mixture is heated with stirring to a temperature of 140° F. which is maintained for a period of 2 hours. After this period 1 gram of azobisisobutyronitrile is added and the mixture stirred at 140° F. for an additional two hours. The mixture is reduced to ambient temperature and a solid polymer is recovered by filtration. The polymer is washed with water, partially air dried and dried for 12 hours at 250° F. The polymer 40 grams is then pyrolyzed at 300° to 450° F. in an air stream over a period of 12 hours. The material obtained is then pelleted and calcined at 800° F. for a period of 30 minutes under a nitrogen atmosphere. The polymer is then recovered. The polymer is then contacted with an aqueous solution of chloroplatinic acid under the conditions set forth above in Example 1. A platinum containing pyrolyzed polyacrylonitrile polymer is then recovered.

In Tables I and II following are the results obtained for the hydrogenation of 2-nitropropane to isopropylamine and the dehydrogenation of isopropyl alcohol to acetone. The apparatus that was utilized consisted of a 5 cc. micro-reactor equipped with reactant inlet means, product exit means, heating means and gas chromatography apparatus to determine the conversion to the desired product. The reactant inlet means consisted of a liquid receiver for holding the reactant and a gas bubbler which allowed hydrogen or helium gas to be bubbled through the reactant inlet means to the micro-reactor. For the hydrogenation of 2-nitropropane to isopropylamine, a space velocity of 555 cubic centimeters per hour per gram of catalyst, a gas stream which comprised 1.84 mole percent 2-nitropropane and 98.2 percent mole hydrogen and a temperature of 250° F. were utilized. The analysis of the product was done by gas chromatography. For the conversion of isopropyl alcohol to acetone, a space velocity of 555 cubic cc. per hour per gram of catalyst, a gas stream which comprised 5.3 mole percent isopropyl alcohol and 94.7 mole percent of helium and a temperature of 500° F. were utilized. The products were analyzed by gas chromatography. The mole percent conversion to the desired product and the mole percent of secondary products are set forth in Table I for the hydrogenation of 2-nitropropane to isopropylamine and in Table II for the conversion of isopropyl alcohol to acetone. In Examples 8 and 13 set forth in Tables I and II, respectively, the pyrolyzed polyacrylonitrile polymer was obtained from Example 1 prior to conversion of the polymer to the platinum containing catalyst.

TABLE I

| Example Number | Catalyst | Conversion, mole percent | Isopropyl amine, mole percent | Diisopropyl amine, mole percent | Comments |
|---|---|---|---|---|---|
| 7 | Girdler G69 [1] | 100 | Trace | 38 | 44 mole percent tri-propylamine, 18 mole percent n-propyl alcohol. |
| 8 | Pyrolyzed polyacrylonitrile polymer | | | | No reaction. |
| 9 | 0.5 wt. percent Pt. on silica gel | | | | Nothing comes off catalyst. |
| 10 | Copper chromite | 100 | Trace | 23 | 17 mole percent tri-propylamine, 24 mole percent n-propyl alcohol. |
| 11 | 0.5 wt. percent Pt. on pyrolyzed polyacrylonitrile polymer from Ex. 1. | 100 | 99 | 1 | |
| 12 | 5 wt. percent Ni on pyrolyzed polyacrylonitrile polymer from Ex. 2. | 100 | 96 | 3 | |

[1] 50% nickel on kieselguhr with 2 wt. percent zirconium.

TABLE II

| Example Number | Catalyst | Conversion, mole percent | Acetone, mole percent | Propylene, mole percent | Light gases other than propylene, mole percent |
|---|---|---|---|---|---|
| 13 | Pyrolyzed polyacrylonitrile polymer | 14 | 2.6 | 8.4 | 1.7 |
| 14 | 0.5 wt. percent Pt. on activated carbon | 100 | 4 | 96 | |
| 15 | 0.75 wt. percent Pt. on silica gel | 100 | 57 | 41 | |
| 16 | 0.50 wt. percent Pt. on pyrolyzed polyacrylonitrile polymer from Ex. 1. | 98 | 96 | | 2.0 |

The results obtained set forth in Tables I and II demonstrate the outstanding performance of the process of this invention, for the conversion of organic nitro compounds to an organic primary amine, at high yields while minimizing the formation of undesired side reactions of products. More particularly, the results in Table I demonstrate that the Group VIII metal containing pyrolyzed polyacrylonitrile polymers produced 99 mole percent conversion of 2-nitropropane to isopropylamine in the case of platinum and 96 mole percent conversion in the case of nickel. These results are in sharp contrast to a copper-chromite catalyst which produced trace quantities of isopropylamine and to the use of platinum on silica gel and to a pyrolyzed polyacrylonitrile polymer which produced essentially no reaction. With respect to the conversion of organic secondary alcohols to organic ketones, results in Table II demonstrate that the mole percent conversion utilizing the catalyst of this invention produced a conversion to acetone of 96% whereas a comparison with pyrolyzed polyacrylonitrile polymer platinum on activated carbon and platinum on silica gel, produced conversions to acetone of 2.6%, 4%, and 57%, respectively. Thus, in the cases of platinum catalysts other than the catalyst of this invention, conversions to undesired side reaction products was extensive. It is clear from the results set forth in Tables I and II that the catalyst of this invention produces high conversions to the desired product while minimizing the formation of undesired side reaction products. These results are in sharp contrast to those obtained with traditional platinum catalysts under the same hydrogenation and dehydrogenation conditions.

We claim:

1. A catalyst prepared by the process which comprises (1) pyrolyzing in the presence of air a polyacrylonitrile polymer at a temperature of about 300° F. to 500° F. under a pressure of about 0.1 to about 2 atmospheres (2) contacting the pyrolyzed polymer from step 1 with an aqueous solution of a Group VIII metal halide, a Group VIII metal chloro acid or nickel acetate; removing water from the solution of polymer and Group VIII metal, (3) thermally treating the polymer at a temperature in the range of about 400°° F. to about 700° F.; (4) reducing said polymer in a hydrogen atmosphere at a temperature in the range of about 500° to about 700° F. under a pressure of about 15 p.s.i.g. to 50 p.s.i.g. at a hydrogen gas rate of about 0.5 cu. ft. per hour to about 2.0 cu. ft. per hour and (5) recovering a Group VIII metal containing pyrolyzed polyacrylonitrile polymer containing from 0.2 to 50 weight percent Group VIII metal.

2. A catalyst of claim 1 wherein the polyacrylonitrile polymer comprises at least 90% by weight of polymerized monomer units derived from acrylonitrile.

3. A catalyst of claim 1 wherein the polyacrylonitrile polymer comprises at least 95% by weight polymerized monomer units derived from acrylonitrile.

4. A catalyst of claim 1 wherein the polyacrylonitrile polymer has a molecular weight of from about 25,000 to about 1,300,000.

5. The catalyst of claim 1 wherein said Group VIII metal is selected from the group consisting of platinum, palladium and nickel.

6. The catalyst of claim 1 wherein the metal content ranges from about 0.5 weight percent to about 5 weight percent.

References Cited
UNITED STATES PATENTS 3,230,180   1/1966   Larson _____ 252—431 IV
3,617,506   11/1971  Cole et al. _____ 252—421

DANIEL E. WYMAN, Primary Examiner

A. P. DEMERS, Assistant Examiner

U.S. Cl. X.R.

252—421, 426, 431 N, 447; 260—270 R, 439 R, 583 M, 596